US011643345B2

(12) United States Patent
Yatsugi et al.

(10) Patent No.: US 11,643,345 B2
(45) Date of Patent: *May 9, 2023

(54) METHOD FOR TREATING ORGANIC WASTEWATER, AND DEVICE FOR TREATING ORGANIC WASTEWATER

(71) Applicant: Kubota Corporation, Osaka (JP)

(72) Inventors: Soichiro Yatsugi, Hyogo (JP); Shinya Nagae, Hyogo (JP); Hitoshi Yanase, Hyogo (JP); Yuko Tsuzuki, Hyogo (JP)

(73) Assignee: Kubota Corporation, Osaka (JP)

( * ) Notice: Subject to any disclaimer, the term of this patent is extended or adjusted under 35 U.S.C. 154(b) by 125 days.

This patent is subject to a terminal disclaimer.

(21) Appl. No.: 17/187,245

(22) Filed: Feb. 26, 2021

(65) Prior Publication Data

US 2021/0179462 A1 Jun. 17, 2021

Related U.S. Application Data

(63) Continuation of application No. PCT/JP2019/035456, filed on Sep. 10, 2019.

(30) Foreign Application Priority Data

Sep. 13, 2018 (JP) .............................. JP2018-171402

(51) Int. Cl.
  *C02F 3/12* (2023.01)
  *C02F 3/30* (2023.01)
(52) U.S. Cl.
  CPC ............ *C02F 3/121* (2013.01); *C02F 3/1273* (2013.01); *C02F 3/302* (2013.01);
  (Continued)
(58) Field of Classification Search
  CPC ........ C02F 3/121; C02F 3/1273; C02F 3/302; C02F 2203/006; C02F 2301/046; C02F 2301/08; C02F 3/1268
  (Continued)

(56) References Cited

U.S. PATENT DOCUMENTS 6,406,629 B1 6/2002 Husain et al.
2004/0238441 A1 12/2004 Tanaka et al.
(Continued)

FOREIGN PATENT DOCUMENTS

CN 206384922 8/2017
JP 2000-140886 5/2000
(Continued)

OTHER PUBLICATIONS

International Search Report from International Application No. PCT/JP2019/035456 dated Dec. 10, 2019.

*Primary Examiner* — Claire A Norris
(74) *Attorney, Agent, or Firm* — Beyer Law Group LLP (57) ABSTRACT

An organic wastewater treatment device includes a biological treatment tank having a plurality of biological treatment units connected in series, where each biological treatment unit includes a pair of an anoxic tank disposed on an upstream side and an aerobic tank disposed on a downstream side along a flow of the organic wastewater, where a membrane separation device is immersed in activated sludge in the aerobic tank, a sludge return path from the aerobic tank on the most downstream side to the anoxic tank on the most upstream side, and an anaerobic tank for anaerobically treating the organic wastewater, which is then divided and supplied to the anoxic tank of each biological treatment unit. By repeating the denitrification in the anoxic tank and the nitrification in the aerobic tank. The membrane-permeated liquid from the membrane separation device in each biological treatment unit is discharged as treated water.

9 Claims, 8 Drawing Sheets

(52) U.S. Cl.
CPC .. *C02F 2203/006* (2013.01); *C02F 2301/046* (2013.01); *C02F 2301/08* (2013.01)

(58) Field of Classification Search
USPC .......................................................... 210/605
See application file for complete search history.

(56) References Cited

U.S. PATENT DOCUMENTS

| | | |
|---|---|---|
| 2012/0234754 A1 | 9/2012 | Yatsugi et al. |
| 2016/0304369 A1 | 10/2016 | Xin et al. |

FOREIGN PATENT DOCUMENTS

| | | | |
|---|---|---|---|
| JP | 2004-305916 | 11/2004 | |
| JP | 2011-000555 | 1/2011 | |
| JP | 2013-046905 | 3/2013 | |
| JP | 2017-113711 | 6/2017 | |
| WO | WO-2011160603 A1 * | 12/2011 | .............. C02F 3/308 |

* cited by examiner

METHOD FOR TREATING ORGANIC WASTEWATER, AND DEVICE FOR TREATING ORGANIC WASTEWATER

CLAIM OF PRIORITY

This application is a Continuation of International Patent Application No. PCT/JP2019/035456, filed on Sep. 10, 2019, which claims priority to Japanese Patent Application No. 2018-171402, filed on Sep. 13, 2018, each of which is hereby incorporated by reference.

BACKGROUND OF THE INVENTION

1. Field of the Invention

The present invention relates to an organic wastewater treatment method and an organic wastewater treatment device.

2. Description of the Related Art

Conventionally, as an organic wastewater treatment methods using activated sludge to biologically treat organic wastewater containing nitrogen and phosphorus, a circulating-type anaerobic-aerobic method (referred to as A2O method (or UCT method)) has been widely adopted, which includes an anaerobic tank, an anoxic tank, and an aerobic tank provided in this order, such that sludge from the aerobic tank is circulated to the anaerobic tank and the anoxic tank. In recent years, the MBR method (e.g., UCT-MBR), in which a membrane separation device is immersed in the aerobic tank in place of a settling tank for solid-liquid separation, has attracted attention.

Japanese Patent Publication No. 2000-140886 discloses a compactly build treatment facility for nitrogen-containing wastewater with a nitrogen removal rate of 90% or more. The treatment facility includes a plurality of anaerobic tanks and aerobic tanks which are alternately connected in series in the order of anaerobic tank and aerobic tank, and a supply path for supplying the nitrogen-containing wastewater to the anaerobic tank in the first stage and at least one anaerobic tank in the second and subsequent stages. The aerobic tank in the last stage is provided with an immersion-type separation device for separating the activated sludge so as to obtain the treated liquid, and a flow path to return the activated sludge from the last-stage aerobic tank to the first-stage anaerobic tank. Precisely speaking, the anaerobic tank of the treatment facility functions as an anoxic tank.

Japanese Patent Publication No. 2004-305916 discloses a membrane separation device that performs an advanced treatment using a single treatment tank. The membrane separation device includes an endless-type treatment tank for biologically treating water to be treated, in which the water to be treated forms a swirling flow, a plurality of membrane units for membrane-separating the water to be treated, which are installed in the swirling flow at intervals in the flow direction, and a raw water tank for storing the water to be treated, from which the water to be treated is supplied to the treatment tank. The raw water tank is installed inside the swirling flow, and a supply means for supplying the treated water from the raw water tank to the treatment tank is configured to supply the water in multiple stages along the flow direction of the swirling flow.

Since the organic wastewater is supplied to an anaerobic treatment region formed adjacent to an aerobic treatment region in which each separation membrane is immersed, any of the above-described wastewater treatment facilities can realize a high denitrification performance in the anaerobic treatment region under high BOD concentration.

On the other hand, in order to remove phosphorus contained in organic wastewater using the membrane bioreactor, a conventional phosphorus removal employs such a method as removing phosphorus by adding a flocculant to an aerobic tank such that phosphorus precipitates as insoluble phosphate, or biologically removing phosphorus using activated sludge to absorb phosphorus.

BRIEF DESCRIPTION OF THE INVENTION

However, when a flocculant-based dephosphorization method is applied to the membrane bioreactor process, not only a cost for the chemicals becomes high, but also the cost for treating the sludge increases because the volume of excess sludge generated also increases, and the frequency of chemical cleaning increases due to the clogging of the membrane caused by inorganic substances originating from the flocculant, resulting in an increase in maintenance costs.

In addition, when a biological dephosphorization method is applied to MBRs, the phosphorus concentration in the treated water temporarily increases immediately after chemical cleaning of the membranes, and when the number of series of treatment is small, attention must be paid to the deterioration of the quality of the treated water, which makes the water quality management more complicated.

The object of the present invention is to provide an organic wastewater treatment method and an organic wastewater treatment device capable of efficiently denitrifying and dephosphorizing organic wastewater containing nitrogen and phosphorus without increasing the costs.

In order to achieve the above-mentioned object, a first characteristic configuration of the organic wastewater treatment method according to the present invention is an organic wastewater treatment method in which organic wastewater containing nitrogen and phosphorus is biologically treated in activated sludge in an organic wastewater treatment device. The organic wastewater treatment device includes a biological treatment tank in which a plurality of biological treatment units are connected in series, where each biological treatment unit includes a pair of an anoxic tank and an aerobic tank, in which the anoxic tank is disposed on an upstream side along a flow of the organic wastewater, while the aerobic tank is disposed on a downstream side of the flow and provided with a membrane separation device immersed in the activated sludge therein, and a sludge return path for returning the activated sludge from the aerobic tank disposed on a most downstream side to the anoxic tank disposed on a most upstream side. The organic wastewater treatment device further includes an anaerobic tank, in which the organic wastewater is anaerobically treated. The anaerobically treated wastewater is then divided and supplied to the anoxic tank of each biological treatment unit, such that the organic wastewater is biologically treated by repeating the denitrification process in the anoxic tank and the nitrification process in the aerobic tank, whereby the membrane-permeated liquid from the membrane separation device in each biological treatment unit is discharged as treated water.

According to this organic wastewater treatment method, the entire volume of organic acid contained in the organic wastewater can be used for desorption of phosphorus in the anaerobic tank, and thus high phosphorus removal performance can be obtained without using a flocculant.

Furthermore, since it is possible to provide each biological treatment unit with a switch regulation of the membrane separation device between a suspended state and an operating state based on a degree of the nitrification/denitrification load for the organic wastewater treatment, the power required for an aeration device installed in the membrane separation device can be optimized, while ensuring high denitrification performance, thereby reducing operating costs.

In addition, by allowing chemical cleaning of the membranes to be carried out independently in each aerobic tank, the increase in the phosphorus concentration in the treated water after the cleaning can be controlled.

A second characteristic configuration of the organic wastewater treatment method is that, in addition to the first characteristic configuration described above, the activated sludge is returned from the anoxic tank to the anaerobic tank.

The organic acid contained in the organic wastewater fed into the anaerobic tank enhances the desorption of phosphorus from the returned activated sludge, which promotes excessive phosphorus absorption by the activated sludge which subsequently flows down to the aerobic tank, resulting in an efficient phosphorus removal.

A first characteristic configuration of the wastewater treatment device according to the present invention is an organic wastewater treatment device in which organic wastewater containing nitrogen and phosphorus is biologically treated in activated sludge. The organic wastewater treatment device includes a biological treatment tank in which a plurality of biological treatment units are connected in series, each biological treatment unit having a pair of an anoxic tank and an aerobic tank, where the anoxic tank is disposed on an upstream side along a flow of the organic wastewater, while the aerobic tank is disposed on a downstream side of the flow and provided with a membrane separation device immersed in the activated sludge therein, an anaerobic tank in which the organic wastewater is anaerobically treated, a sludge return path for returning the activated sludge from the aerobic tank disposed on a most downstream side to the anoxic tank disposed on a most upstream side, a raw water supply path for dividing and supplying the organic wastewater from the anaerobic tank to the anoxic tank of each biological treatment unit, and a treated water discharge path for discharging membrane-permeated liquid from the membrane separation device of each biological treatment unit as treated water.

The organic wastewater containing nitrogen and phosphorus is led to the anaerobic tank, in which an anaerobic treatment is conducted to expel phosphorus from the activated sludge, the treated organic wastewater is divided and supplied to the anoxic tank of each biological treatment unit via the raw water supply path.

The organic wastewater divided and supplied to the anoxic tank, together with the activated sludge, flows from the anoxic tank on the upstream side to the aerobic tank on the downstream side in each biological treatment unit, whereby denitrification and nitrification process are repeated, and then the treated organic wastewater, together with the activated sludge, retunes from the aerobic tank located at the most downstream side to the anoxic tank located at the most upstream side via the sludge return path, whereby the denitrification process is repeated efficiently, and then the treated water is extracted by solid-liquid separation performed by the membrane separation device immersed in each aerobic tank.

The second characteristic configuration of the wastewater treatment device is that, in addition to the first characteristic configuration described above, an anaerobic tank return path for returning the activated sludge from the anoxic tank to the anaerobic tank is further provided.

The organic acid contained in the organic wastewater fed into the anaerobic tank enhances the desorption of phosphorus from the returned activated sludge, which promotes excessive phosphorus absorption by the activated sludge which subsequently flows down to the aerobic tank, resulting in efficient phosphorus removal.

A third characteristic configuration of the wastewater treatment device is that, in addition to the first and/or second characteristic configurations described above, the biological treatment tank forms a loop by alternately arranging the anoxic tanks and the aerobic tanks, and the anaerobic tank is disposed inside the loop.

By arranging the plurality of biological treatment units to form a loop, the sludge return path can be formed with a minimum length, and by disposing the anaerobic tank inside the loop, each water path connecting the anaerobic tank and each anoxic tank can be formed with a minimum and equal length, whereby the wastewater treatment device can be compactly configured.

A fourth characteristic configuration of the wastewater treatment device is that, in addition to any of the first through third characteristic configurations described above, each anoxic tank and the corresponding aerobic tank are arranged vertically with a boundary wall provided therebetween, such that the aerobic tank is placed above the boundary wall and the anoxic tank is placed below the boundary wall.

Since the aerobic tank is disposed above the anoxic tank, the installation area can be greatly reduced, and a compact organic wastewater treatment device can be realized. Moreover, since the anoxic tank is installed below the aerobic tank with the boundary wall interposed therebetween, the anoxic tank does not have to be provided with a special lid for sealing off the outside air, thereby reducing the cost of the equipment.

As is explained above, according to the present invention, it has become possible to provide an organic wastewater treatment method and an organic wastewater treatment device which can efficiently denitrify and dephosphorize organic wastewater containing nitrogen and phosphorus without increasing the cost.

DETAILED DESCRIPTION OF EMBODIMENTS OF THE INVENTION

Hereinafter, embodiments of the organic wastewater treatment method and the organic wastewater treatment device according to the present invention will be described referring to the drawings. The wastewater treatment device according to the present invention is an organic wastewater treatment device in which organic wastewater containing nitrogen and phosphorus is biologically treated in activated sludge.

Figure 1:
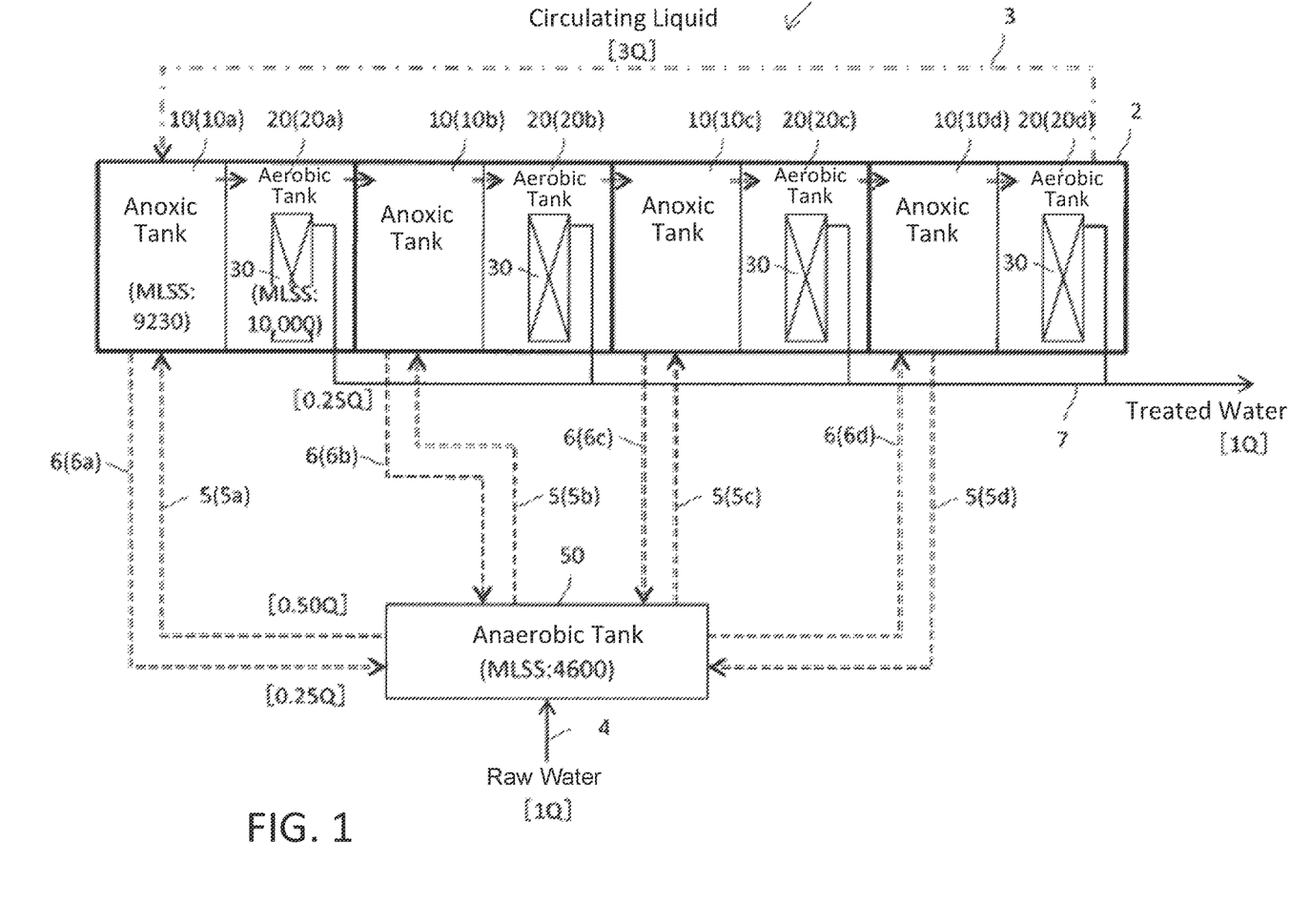
FIG. 1 is an explanatory diagram illustrating an overview of a wastewater treatment device for treating organic wastewater containing nitrogen and phosphorus, in accordance with the present invention.

FIG. 1 illustrates a concept of the organic wastewater treatment device. The wastewater treatment device 1 includes a biological treatment tank 2 in which a plurality of biological treatment units are connected in series, where each biological treatment unit is formed of a pair an anoxic tank 10 (10a, 10b, 10c, 10d) disposed on an upstream side and an aerobic tank 20 (20a, 20b, 20c, 20d) disposed on a downstream side along a flow of organic wastewater (also referred to as "raw water") containing nitrogen and phosphorus.

The aerobic tank 20 (20a, 20b, 20c, 20d) is provided with a membrane separation device 30 immersed in the activated sludge, and a sludge return path 3 for returning the activated sludge from the aerobic tank 20d disposed on the most downstream side to the anoxic tank 10a disposed on the most upstream side.

The wastewater treatment device 1 further includes an anaerobic tank 50 for anaerobically treating the organic wastewater delivered via a raw water introduction path 4, a raw water supply path 5 (5a, 5b, 5c, 5d) for dividing and supplying the organic wastewater from the anaerobic tank 50 to the anoxic tank 20 in each biological treatment unit, an anaerobic tank return path 6 (6a, 6b, 6c, 6d) for returning the activated sludge from the anoxic tank 10 to the anaerobic tank 50, and a treated water discharge path 7 for discharging membrane-permeated liquid from the membrane separation device 30 of each biological treatment unit as treated water.

According to the wastewater treatment device 1, the organic acid contained in the organic wastewater, which is the raw water, is used to expel phosphorus in the anaerobic tank 50, whereby high phosphorus removal performance can be obtained without using a flocculant. In other words, the organic acid contained in the organic wastewater supplied to the anaerobic tank 50 significantly enhances desorption of phosphorus from the activated sludge which is returned via the anaerobic tank return path 6, which promotes an excess intake of phosphorus by the activated sludge which flows down to the aerobic tank 20, whereby phosphorus can be efficiently removed without the use of flocculant for precipitating phosphorus as insoluble phosphate.

In addition, since nitrate-nitrogen, which has been nitrified from ammoniacal nitrogen in the aerobic tank 20, is reduced to nitrogen in the anoxic tank 10, an effective denitrification process can be achieved.

In the example shown in FIG. 1, with respect to an inflow volume 1Q of the raw water, a circulation volume of the activated sludge in the biological treatment tank 2 is set to 3Q; the total extraction volume of the treated water by the membrane separation device 30 is set to 1Q (=0.25Q×4), a supply volume of the activated sludge including raw water from the anaerobic tank 50 to the anoxic tank 10 is set to 2Q (=0.5Q×4), and a return volume from the anoxic tank 10 to the anaerobic tank 50 is set to 1Q (=0.25Q×4). As a result, with respect to the biological treatment units each having a pair of the anoxic tank and the aerobic tank, a hypothetical circulation ratio of 12Q (=circulation volume 3Q×4 biological treatment units) can be realized for the inflow volume 1Q.

In the example of FIG. 1, the activated sludge is returned to the anaerobic tank 50 from all of the anoxic tanks 10 forming the plurality of biological treatment units. However, it is also possible to configure the wastewater treatment device such that the activated sludge is returned to the anaerobic tank 50 from at least one anoxic tank 10.

Figure 3A:
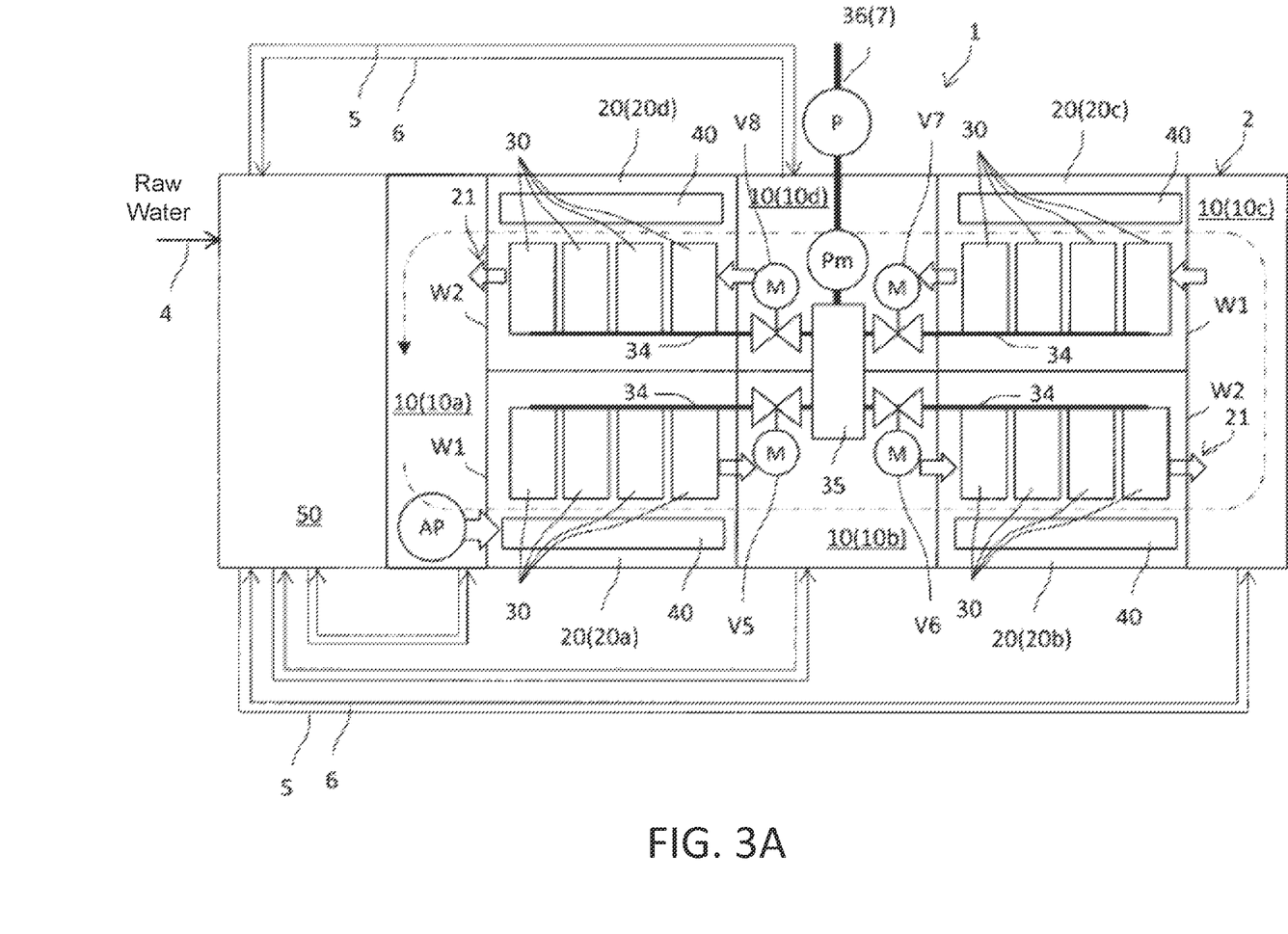
FIG. 3A is an explanatory diagram illustrating a plan view of the wastewater treatment device according to one embodiment of the present invention.
Figure 3B:
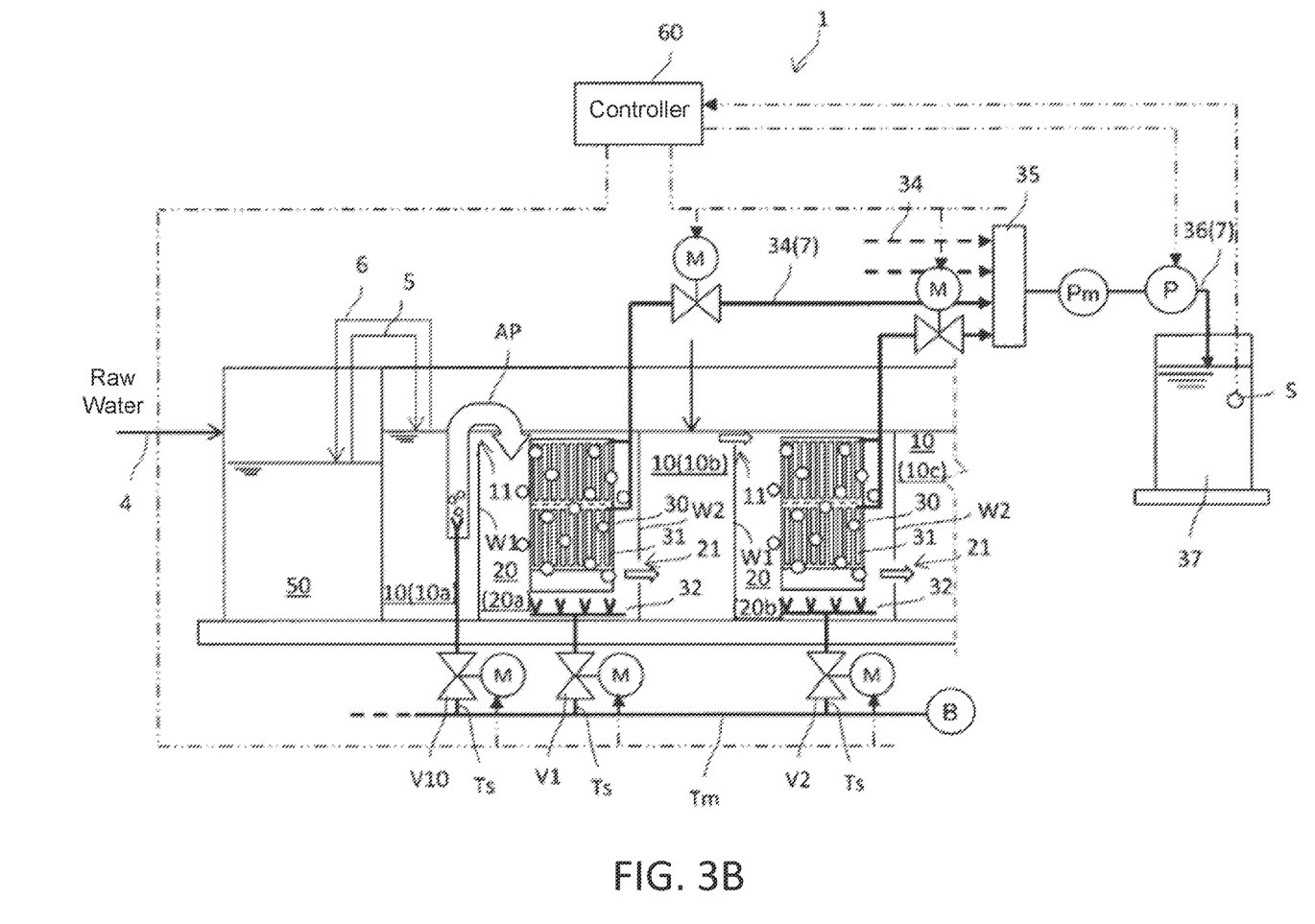
FIG. 3B is an explanatory diagram illustrating a front view of the wastewater treatment device in accordance with one embodiment of the present invention.

FIGS. 3A and 3B show an example of the wastewater treatment device 1 in which the anoxic tanks 10 and the aerobic tanks 20 of the biological treatment units are alternately arranged such that the biological treatment tank 2 is configured as a whole to form a loop. In the wastewater treatment device 1, the biological treatment tank 2 is provided with a single anaerobic tank 50, where the anaerobic tank 50 is connected to each of the anoxic tanks 10 individually by a raw water supply path 5 and an anaerobic tank return path 6.

In this embodiment, the biological treatment tank 2 is formed of four pairs of the biological treatment units which are arranged in series in an endless manner along the flow of organic wastewater. The number of biological treatment units can be of any plurality, and is not limited to four pairs as is in this example.

A plurality of biological treatment units can be configured by partitioning a single biological treatment tank 2 into a plurality of areas. The biological treatment tank 2 may also be constructed by arranging a plurality of pairs of individual anoxic tank 10 and aerobic tank 20 along the flow of organic wastewater.

The organic wastewater, which is the raw water, is introduced into the anaerobic tank 50 via the raw water introduction path 4, and release of phosphorus from the activated sludge, which is an anaerobic treatment, is performed in the anaerobic tank 50. The raw water is supplied from the anaerobic tank 50 to each anoxic tank 10, along with the activated sludge, via the raw water supply path 5 by being divided into substantially equal amounts.

After denitrification, which is an anaerobic treatment, is carried out in each anoxic tank 10, the raw water, together with the activated sludge, flows into the aerobic tank 20 on the downstream side, where nitrification, which is an aerobic treatment, is carried out.

A membrane separation device 30 is installed in each aerobic tank 20 by being immersed therein, and an auxiliary diffuser 40 for an aerobic treatment is installed in the vicinity thereof. A portion of the activated sludge is returned from each anoxic tank 10 to the anaerobic tank 50 via the anaerobic tank return path 6, and desorption of phosphorus is performed in the anaerobic tank 50.

An airlift pump AP is installed in the anoxic tank 10 (10a) on the most upstream side, such that the organic wastewater along with the activated sludge is transferred to the aerobic tank 20 (20a) on the most downstream side by an upward flow in the airlift pipe generated by air bubbles supplied from a blower B through the valve V10. Thereafter, the organic wastewater, together with the activated sludge, naturally flows down through the anoxic tank 10 (10b), the aerobic tank 20 (20b), the anoxic tank 10 (10c), the aerobic tank 20 (20c), the anoxic tank 10 (10d), and the aerobic tank 20 (20d) in this order.

Installing the airlift pump AP in the anoxic tank 10 does not cause the dissolved oxygen DO to increase in the anoxic tank 10, compared with installing the airlift pump AP in the aerobic tank 20 so as to transfer the wastewater to the anoxic tank 10.

In this embodiment, four pairs of biological treatment units are arranged in an endless manner along the flow of organic wastewater, such that the aerobic tank 20 (20d) on the most downstream side and the anoxic tank 10 (10a) on the most upstream side are adjacent to each other with a partition wall provided therebetween. The sludge return path 3 for returning the activated sludge of the aerobic tank 20 (20d) on the most downstream side to the anoxic tank 10 (10a) on the most upstream side is formed in a portion of the partition wall.

A partition wall W1 is formed between the anoxic tank 10 and the aerobic tank 20, and a cutout 11 (see FIG. 3B) is provided in a part of the upper end side of the partition wall W1 such that the organic wastewater containing the activated sludge overflows from the anoxic tank 10 into the aerobic tank 20.

A partition wall W2 is formed between the aerobic tank 20 and the anoxic tank 10, and an outflow port 21 for the organic wastewater containing activated sludge is provided at a position corresponding to the vicinity of the bottom of the membrane separation device 30 in the vertical direction along the partition wall W2.

The upper end of the opening that serves as the outflow port 21 is submerged in water, and is provided at a location at or lower than 30 cm from the water surface of the aerobic tank 20. The outflow rate of the activated sludge from the outflow port 21 is set to 0.5 msec. or less. The outflow port 21 formed in the aerobic tank 20 (20d) at the most downstream side becomes the sludge return path described above. An arrow shown in FIG. 3A with a double-dotted line indicates that the activated sludge flows through the biological treatment units forms a circulating flow.

The membrane separation device 30 has a plurality of membrane elements 31 and an aeration device 32 installed below the membrane elements 31 (see FIG. 3B). The plurality of membrane elements 31 are arranged with predetermined intervals such that each membrane surface has an upright posture, and housed in a casing with up-and-down two stages.

Figure 2:
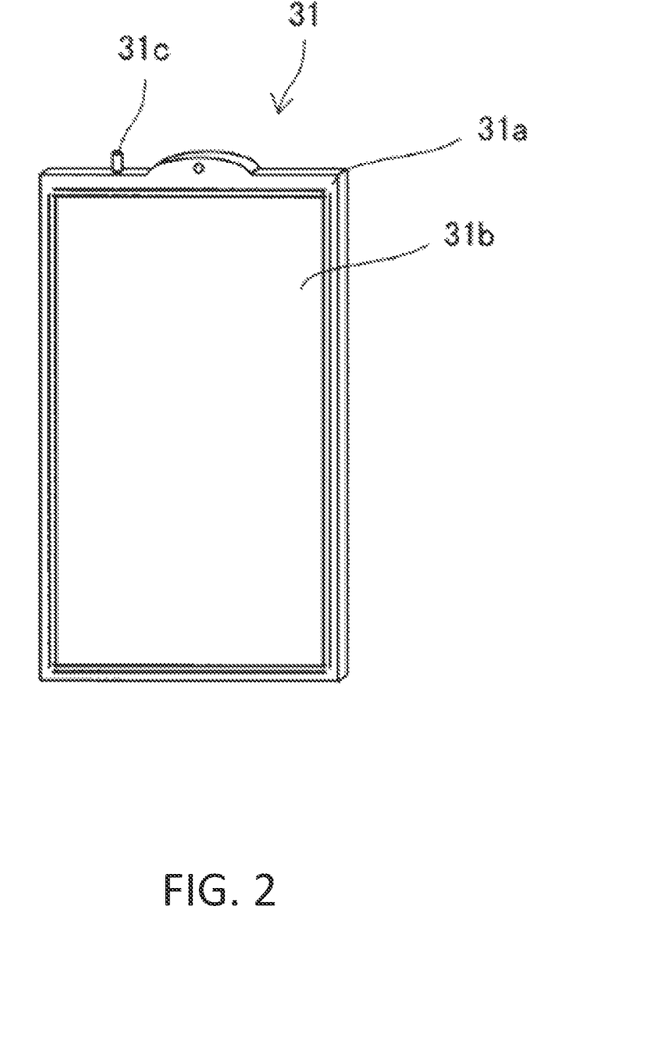
FIG. 2 is an explanatory diagram illustrating a membrane element provided in a membrane separation device.

As shown in FIG. 2, the membrane element 31 is formed by disposing a separation membrane 31b on both of the front and back surfaces of a resin membrane support 31a which has a water collecting pipe 31c at an upper portion thereof. In the present embodiment, the separation membrane 31b is formed of a microfiltration membrane including a porous organic polymer membrane having a nominal pore diameter of about 0.4 μm a surface of a nonwoven fabric.

The types of the separation membrane 31b and the membrane element 31 are not limited to the above-described embodiments, but any type of separation membrane and any form of membrane element (hollow fiber membrane element, tubular membrane element, monolith membrane element, etc.) can be used.

The treated water which has permeated through the separation membrane 31b flows along a groove formed in the membrane support 31a to a water collection pipe 31c, and as shown in FIGS. 3A and 3B, flows from the water collection pipe 31c to an air separation tank 35 via a respective header pipe 34, and then is collected into a treated water tank 37 via a liquid transfer pipe 36 connected to the air separation tank 35.

The header pipes 34 are provided with respective valves V5, V6, V7, and V8 for flow rate adjustment, and the liquid transfer pipe 36 is provided with a suction pump P. The amount of permeated water from each membrane separation device 30 is adjusted by a pressure control using the suction pump P and an opening degree control using the valves V5, V6, V7, V8.

In order to detect the transmembrane pressure difference of the membrane separation device 30, a pressure sensor Pm is provided between the air separation tank 35 and the suction pump P. In FIGS. 3A and 3B, a reference symbol M indicates a motor for adjusting the opening degree of the valves. A treated water discharge path 7 is formed by a flow path from the water collection pipe 31c through the header pipe 34 to the air separation tank 35, then from the air separation tank 35 through the liquid transfer pipe 36 connected thereto, into the treated water tank 37 where the treated water is collected.

A main blow tube Tm is connected to the blower B, and four secondary blow tubes Ts are branched from the main blow pipe Tm, and a respective aeration device 32 is connected to each secondary blow tube Ts. Correspondingly to the membrane separation devices 30 installed in the respective aerobic tanks 20, valves V1, V2, . . . , are respectively provided to the secondary blow tubes Ts for a flow rate control, such that an aeration amount, stopping and starting of the aeration can be controlled.

The organic wastewater is aerated together with the activated sludge in the aerobic tank 20 by an auxiliary air diffuser 40, whereby the organic substance is decomposed and ammonia nitrogen is nitrified to nitrate nitrogen. The activated sludge excessively absorbs phosphorus, part of which is then solid-liquid separated by the membrane separation device 30 as the treated water.

The organic wastewater that has been nitrified in the aerobic tank 20 flows, together with the activated sludge which has excessively absorbed phosphorus, into the adjacent anoxic tank 10 on the downstream side, in which a denitrification process proceeds to remove nitrate nitrogen by reducing it into nitrogen gas. Then the organic wastewater is returned from each anoxic tank 10 to the anaerobic tank 50 via the anaerobic tank return path 6, whereby phosphorus is released from the activated sludge and the denitrification process is promoted.

Suppose an inflow amount of the raw water per unit time is Q, and an inflow amount of the raw water into each anoxic tank 10 is Q/4, and when a total amount Q of the permeated liquid is extracted from each membrane separation device 30 as the treated water, and an amount 3Q of the activated sludge in the aerobic tank 20 (20d) at the most downstream side is returned to the anoxic tank 10 (10a) at the most upstream side via the sludge return path, a substantial circulation ratio of the sludge becomes 3Q×4 biological treatment units, so as to realize a high circulation ratio of 12Q. This increases MSLL concentration in the anoxic tank 10, which makes it possible to reduce a tank capacity of the anoxic tank 10.

The organic wastewater treatment device 1 is provided with a flow meter for measuring an amount of inflow of the organic wastewater, a liquid level meter for measuring a tank water level of the biological treatment tank, a pressure sensor for measuring the transmembrane pressure difference of each membrane separation device, and a plurality of measuring instruments such as a measurement device S provided to the treated water tank 37 for measuring the T-N concentration and the $NH_3$-N concentration of the treated water.

A control unit 60 is further provided, which serves as a controller for controlling operations of the organic wastewater treatment device 1 based on the values measured by these measuring instruments. The control unit 60 is implemented in a control panel with a computer including an arithmetic circuit, an input circuit, an output circuit, and the like.

The control unit 60 monitors the measured values from these measuring instruments, such as a degree of the inflow amount of the raw water, the water level of the biological treatment tank 2, the value of each pressure sensor Pm, and the value of the measurement device S provided to the treated water tank 37 for measuring the total nitrogen (T-N) concentration, whereby operates each membrane separation device 30 by alternating a filtration operation state and a relaxation operation state as the two operation modes.

The filtration operation state is a state in which the membrane-permeated water is drawn from the water collecting pipe 31c as the treated water while aeration is performed by the aeration apparatus 32. The relaxation operation state is a state in which a surface of the separation membrane 31b is cleaned by an upward flow which is generated by aeration bubbles from the aeration device 32, while the valves provided to the header pipe 34 are closed or the suction pump P is stopped. The control unit 60 alternately repeats the filtration operation for a first predetermined time period (for example, 9 minutes) and the relaxation operation for a second predetermined time period (for example, 1 minute).

Since the upper end of the opening of the outflow port 21 provided to the aerobic tank 30 is submerged and provided at the location at or lower than 30 cm from the water surface of the aerobic tank 20 (see FIG. 3B), even if the membrane separation device 30 of the aerobic tank 20 is stopped and the activated sludge is not stirred up, the activated sludge is still certainly sent to the anoxic tank on the downstream side.

In addition, since the concentration of the dissolved oxygen DO in the vicinity of the bottom of the membrane separation device 30 is lower than that in the vicinity of the liquid surface, it also possible to suppress an increase in the concentration of the dissolved oxygen in the anoxic tank 10 on the downstream side.

Furthermore, if the inflow velocity of the activated sludge is set equal to or smaller than 0.5 m/sec., a water level difference between the aerobic tank and the anoxic tank due to the inflow of the activated sludge can be suppressed, whereby uniformity in the aeration of the activated sludge in the aerobic tank is enhanced. The cutout 11 is so configured and the amount of air supplied to the air lift pump AP is so adjusted that the inflow velocity of the activated sludge is 0.5 msec. or less.

Figure 4A:
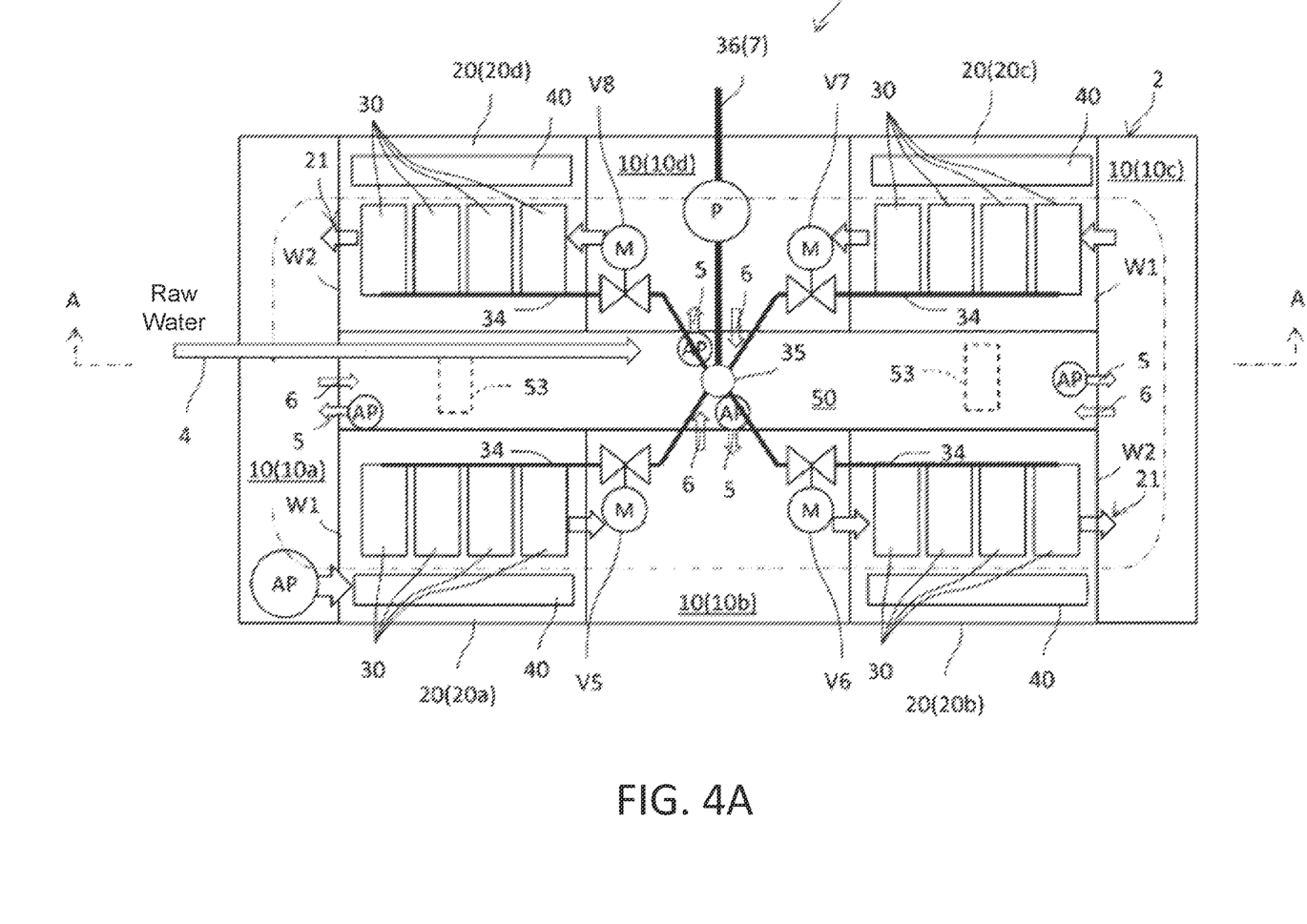
FIG. 4A is an explanatory diagram illustrating a bottom view of a wastewater treatment device in accordance with another embodiment of the present invention.
Figure 4B:
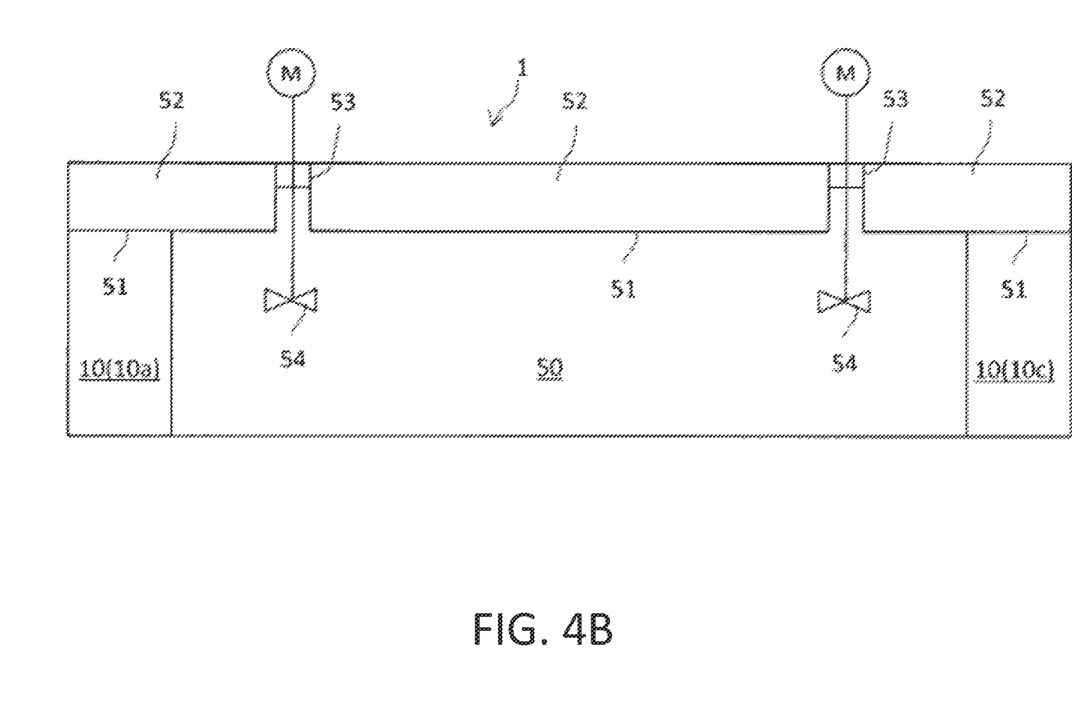
FIG. 4B is a diagram showing the A-A cross section of FIG. 4A, explaining the wastewater treatment device in accordance with another embodiment of the present invention.

FIGS. 4A and 4B show yet another example of the wastewater treatment device 1. The wastewater treatment device 1 includes a biological treatment tank 2, in which a plurality of anoxic tanks 10 and a plurality of aerobic tanks 20 are alternately arranged to form pairs of biological treatment units, thereby making a loop as a whole, and an anaerobic tank 50 arranged inside the loop.

The organic wastewater, which is raw water, is led into an anaerobic tank 50 via a raw water introduction path 4 having a long pipe length, where the raw water introduction path 4 is arranged near the bottom of the anaerobic tank 50. The raw water flows, together with activated sludge, out of the anaerobic tank 50 into each of the anoxic tanks 20 via a respective raw water supply path 5, and the activated sludge flows in from each of the anoxic tanks 20 via a respective anaerobic tank return path 6.

Each raw water supply path 5 is provided with an airlift pump, where the airlift pump pumps the activated sludge to the anoxic tank 10, and each anaerobic tank return path 6 is formed under the water, by an opening provided to a partition wall between the anaerobic tank 50 and the anoxic tank 20.

As shown in FIG. 4B, the anaerobic tank 50 has a grooved ceiling slab 51 at a position lower than the liquid level of the aerobic tank 10 and the anoxic tank 20, such that the grooved space forms a piping pit 52 that accommodates the header pipe 34, the air separation tank 35, the valves V5, V6, V7, V8 for the flow rate adjustment, the liquid transfer pipe 36, the suction pump P, and the like, which are shown in FIG. 3A.

In addition, a tubular portion 53 is formed in the ceiling slab 51, and an agitator blade 54 for stirring the raw water and the activated sludge inside the anaerobic tank 50 is detachably attached to the ceiling slab 51 through the tubular portion 53. In FIG. 4B, the reference symbol M indicates a motor for driving the agitator blade 54. The tubular portion 53 is covered with a lid which prevents outside air from flowing into the anaerobic tank 50. The structures other than that of the anaerobic tank 50 are the same as the structure described in FIGS. 3A and 3B.

By adopting such a structure as described above, a plurality of biological treatment units are arranged to form a loop, which allows to form the sludge return path 3 to have a minimum length, and by arranging the anaerobic tank 50 inside the loop, each of the water paths (the raw water supply path 5 and the anaerobic tank return path 6) connecting the anaerobic tank 50 to each anoxic tank 10 can be formed to have a minimum and also the same length, which allows the wastewater treatment device 1 to be compactly constructed.

Figure 5A:
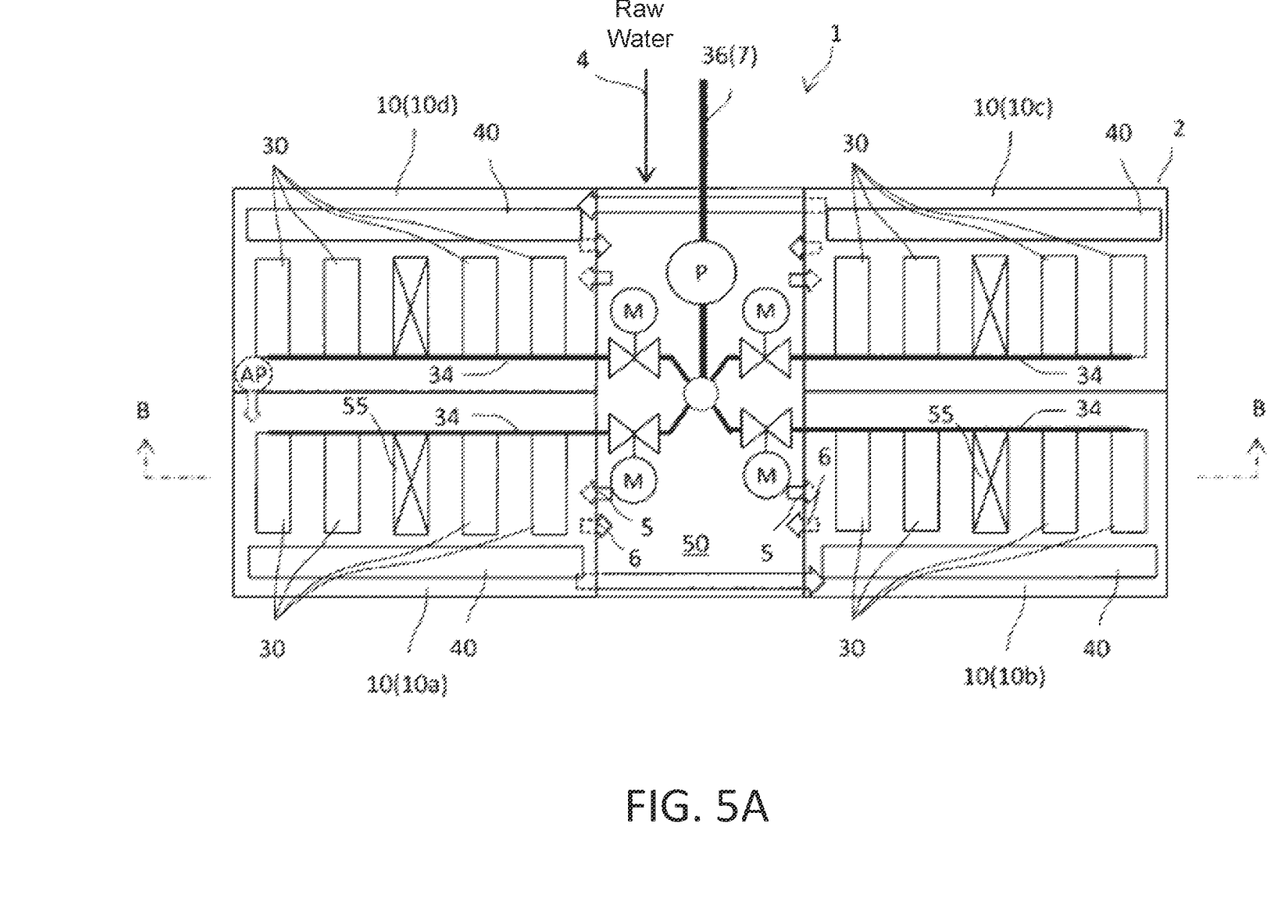
FIG. 5A is an explanatory diagram illustrating a plan view of a wastewater treatment device in accordance with another embodiment of the present invention.
Figure 5B:
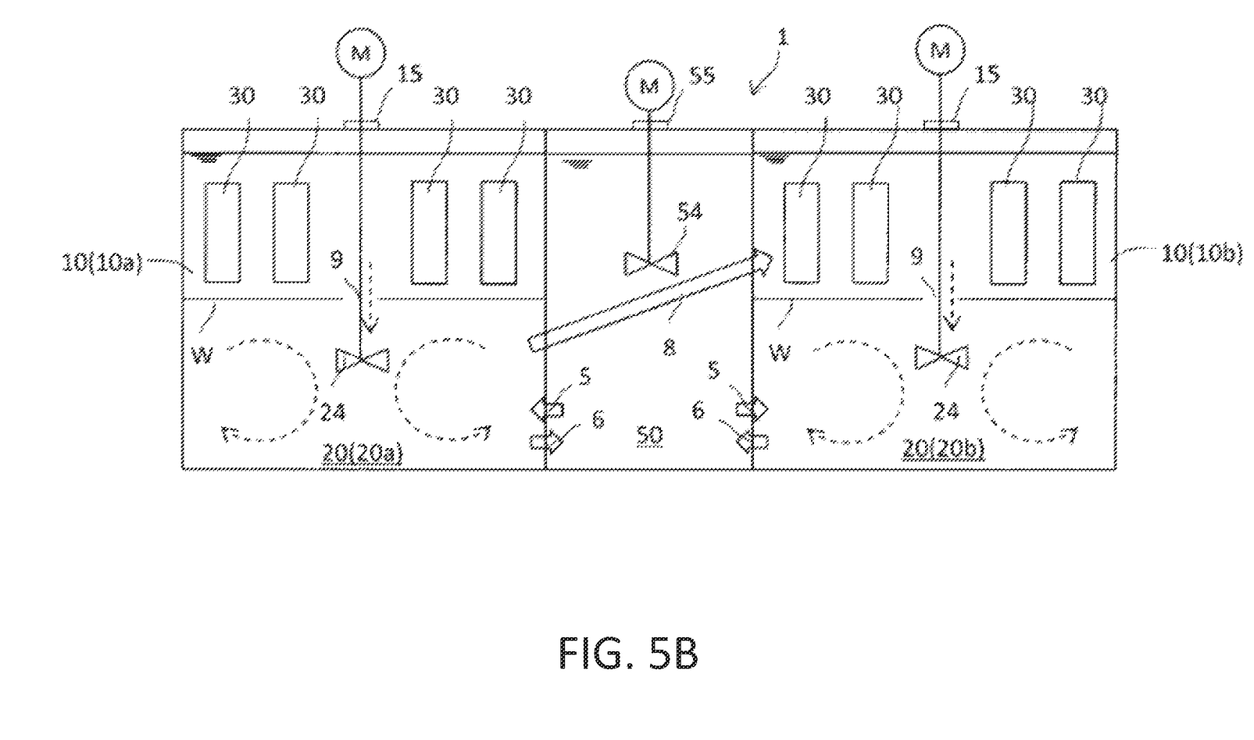
FIG. 5B is a diagram showing a B-B cross section of FIG. 5A, explaining the wastewater treatment device in accordance with another embodiment of the present invention.

FIGS. A5a and 5B show yet another example of the wastewater treatment device 1. In the wastewater treatment device 1, an anaerobic tank 50 is arranged inside a loop formed by a biological treatment tank 2, and an anoxic tank 20 and an aerobic tank 10 are arranged in the vertical direction via a boundary wall W interposed therebetween, such that the aerobic tank 10 is stacked above the boundary wall, and the anoxic tank 20 is stacked below the boundary wall W.

Since the aerobic tank 10 is arranged above the anoxic tank 20, the installation area of the biological treatment tank can be greatly reduced, and a compact organic wastewater treatment device 1 can be realized.

Furthermore, as a result of installing the anoxic tank 20 below the aerobic tank 10 with the boundary wall W interposed therebetween, the anoxic tank 20 is prevented from contacting with the air without providing a special lid for blocking the outside air. Therefore, the generation of scum is suppressed, and thus it is not necessary to install a lid or a defoaming mechanism for blocking the outside air, thereby lowering the equipment costs.

Although not shown in FIG. 5B, the aerobic tanks 10d and 10c are located behind the aerobic tanks 10a and 10b, and the anoxic tanks 20d and 20c are located behind the anoxic tanks 20a and 20b, viewed from the surface of the paper.

The organic wastewater, which is the raw water, is introduced into the anaerobic tank 50 via the raw water introduction path 4, and the raw water, together with the activated sludge, then flows out into each anoxic tank 20 via the raw water supply path 5, which is an opening formed in the partition wall between the anaerobic tank 50 and the anoxic tank 20, while the activated sludge flows in from each anoxic tank 20 via the anoxic tank return path 6, which is also an opening formed in the partition wall. As is shown in FIG. 4A, it is also possible to configure the raw water supply path 5 using an airlift pump.

The aerobic tanks 10 and the anaerobic tank 50 are covered with lids, and agitator blades 24 and 54 for stirring the raw water and the activated sludge inside the anoxic tanks 20 and the anaerobic tank 50, respectively, are detachably attached to the lids through the rectangular openings 15 and 55 formed in the lids. In FIG. 5B, the reference symbol M indicates a respective motor for driving the agitating blades 24 and 54.

The lid covering the anaerobic tank 50 is provided to prevent contact with the outside air, while the lids covering the aerobic tanks 10 are provided to connect the air collection duct such that the odorous gas is not released into the atmosphere.

The activated sludge sent from the anaerobic tank 50 to the anoxic tank 20a along with the raw water via the raw water supply path 5 is stirred up by the agitator blades 24, then transferred to the aerobic tank 10b via an aerobic tank transfer path 8, and then to the anoxic tank 20b directly therebelow via an anoxic tank transfer path 9.

Similarly, the activated sludge is circulated in the order of the anoxic tank 20b, the aerobic tank 10c, the anoxic tank 20d, and the aerobic tank 20a, and is sent back and forth between each anoxic tank 20 and anaerobic tank 50. It is preferable to configure the aerobic tank transfer path 8 provided with an airlift pump.

It is not necessary for each top-and-bottom pair of the aerobic tank 10 and the anoxic tank 20 to be entirely superposed with each other in plan view, but may be overlap with each other. That is, the plurality of aerobic tanks 10 and the plurality of anoxic tanks 20 may only be superposed with each other as a whole in plan view.

FIGS. 5A and 5B describe such a configuration in which the biological treatment tank 2 is arranged as a loop, and the anaerobic tank 50 is disposed inside the loop. However, the anaerobic tank 50 does not have to be arranged inside the loop of the biological treatment tank 2. For example, the relationship between the anoxic tank 20 and the aerobic tank 10 in the configuration shown the FIG. 3A may be modified into such a configuration in which the anoxic tank 20 and the aerobic tank 10 are vertically arranged across a boundary wall W such that the aerobic tank 10 is disposed above the boundary wall W and the anoxic tank 20 is disposed below the boundary wall W.

The organic wastewater treatment method according to the present invention is applied to the organic wastewater treatment device described above, and is an organic wastewater treatment method in which organic wastewater containing nitrogen and phosphorus is biologically treated in activated sludge.

That is, in an organic wastewater treatment device which includes a biological treatment tank in which a plurality of biological treatment units are connected in series, where each biological treatment unit includes a pair of an anoxic tank and an aerobic tank, in which the anoxic tank is disposed on an upstream side along a flow of the organic wastewater, while the aerobic tank is disposed on a downstream side of the flow and provided with a membrane separation device immersed in activated sludge therein, and a sludge return path for returning the activated sludge from the aerobic tank disposed on a most downstream side to the anoxic tank disposed on a most upstream side, an anaerobic tank is further provided. The organic wastewater is anaerobically treated in the anaerobic tank, and then divided and supplied to the anoxic tank of each biological treatment unit, such that the organic wastewater is biologically treated by repeating the denitrification process in the anoxic tank and the nitrification process in the aerobic tank, whereby the membrane-permeated liquid from the membrane separation device in each biological treatment unit is discharged as treated water.

According to this organic wastewater treatment method, the entire volume of organic acid contained in the organic wastewater can be used for desorption of phosphorus in the anaerobic tank, and thus high phosphorus removal performance can be obtained without using a flocculant.

Furthermore, since it is possible to provide a switch regulation of the membrane separation device between a suspended state and an operating state in each biological treatment unit based on a degree of the nitrification/denitrification load for the organic wastewater treatment, the power required for an aeration device installed in the membrane separation device can be optimized, while ensuring high denitrification performance, thereby reducing operating costs.

It is also desirable to return the activated sludge from the anoxic tank to the anaerobic tank, so that the organic acid contained in the organic wastewater fed into the anaerobic tank enhances the desorption of phosphorus from the returned activated sludge, which promotes excessive phosphorus absorption by the activated sludge which subsequently flows down to the aerobic tank, resulting in efficient phosphorus removal.

The above-described embodiments are all examples of the present invention, and the description does not limit the present invention, and the specific configuration of each part can be appropriately modified and designed within the range in which the effects of the present invention are exhibited. In addition, any one or more of the above-mentioned embodiments may be appropriately combined with each other.

What is claimed is:

1. An organic wastewater treatment method for organically treating organic wastewater containing nitrogen and phosphorus in activated sludge in an organic wastewater treatment device including: a biological treatment tank in which a plurality of biological treatment units are connected in series, wherein each biological treatment unit includes a pair of an anoxic tank and an aerobic tank, the anoxic tank being disposed on an upstream side along a flow of the organic wastewater, while the aerobic tank being disposed on a downstream side of the flow and provided with a membrane separation device immersed in activated sludge therein; and a sludge return path for returning the activated sludge from the aerobic tank disposed on a most downstream side to the anoxic tank disposed on a most upstream side, the method comprising:
   providing an anaerobic tank and anaerobically treating the organic wastewater therein, and dividing and supplying the anaerobically treated organic wastewater to the anoxic tank of each biological treatment unit;
   biologically treating the organic wastewater by repeating a denitrification process in the anoxic tank and a nitrification process in the aerobic tank; and
   discharging membrane-permeated liquid from the membrane separation device in each biological treatment unit as treated water.

2. The organic wastewater treatment method according claim 1, further comprising:
   returning the activated sludge from the anoxic tank to the anaerobic tank.

3. An organic wastewater treatment device for organically treating organic wastewater containing nitrogen and phosphorus in activated sludge, comprising:
- a biological treatment tank in which a plurality of biological treatment units are connected in series, each biological treatment unit having a pair of an anoxic tank and an aerobic tank, where the anoxic tank is disposed on an upstream side along a flow of the organic wastewater, while the aerobic tank is disposed on a downstream side of the flow and provided with a membrane separation device immersed in the activated sludge therein;
- an anaerobic tank for anaerobically treating the organic wastewater;
- a sludge return path for returning the activated sludge from the aerobic tank disposed on a most downstream side to the anoxic tank disposed on a most upstream side;
- a raw water supply path for dividing and supplying the organic wastewater from the anaerobic tank to the anoxic tank of each biological treatment unit; and
- a treated water discharge path for discharging membrane-permeated liquid from the membrane separation device of each biological treatment unit as treated water.

4. The organic wastewater treatment device according to claim 3, further comprising:
- an anaerobic tank return path for returning the activated sludge from the anoxic tank to the anaerobic tank.

5. The organic wastewater treatment device according to claim 4, wherein the biological treatment tank forms a loop by alternately arranging the anoxic tanks and the aerobic tanks, and the anaerobic tank is disposed inside the loop.

6. The organic wastewater treatment device according to claim 5, wherein each anoxic tank and the corresponding aerobic tank are arranged vertically with a boundary wall provided therebetween, such that the aerobic tank is placed above the boundary wall and the anoxic tank is placed below the boundary wall.

7. The organic wastewater treatment device according to claim 3, wherein the biological treatment tank forms a loop by alternately arranging the anoxic tanks and the aerobic tanks, and the anaerobic tank is disposed inside the loop.

8. The organic wastewater treatment device according to claim 7, wherein each anoxic tank and the corresponding aerobic tank are arranged vertically with a boundary wall provided therebetween, such that the aerobic tank is placed above the boundary wall and the anoxic tank is placed below the boundary wall.

9. The organic wastewater treatment device according to claim 3, wherein each anoxic tank and the corresponding aerobic tank are arranged vertically with a boundary wall provided therebetween, such that the aerobic tank is placed above the boundary wall and the anoxic tank is placed below the boundary wall.

* * * * *